R. P. BROWN AND C. P. FREY.
INDICATING AND RECORDING INSTRUMENT.
APPLICATION FILED DEC. 9, 1919.

1,355,448.

Patented Oct. 12, 1920.
3 SHEETS—SHEET 1.

ON LINE 2-2. FIG. 3.

INVENTORS
Richard P. Brown
and
Charles P. Frey.
BY
Robert M. Barr
ATTORNEY.

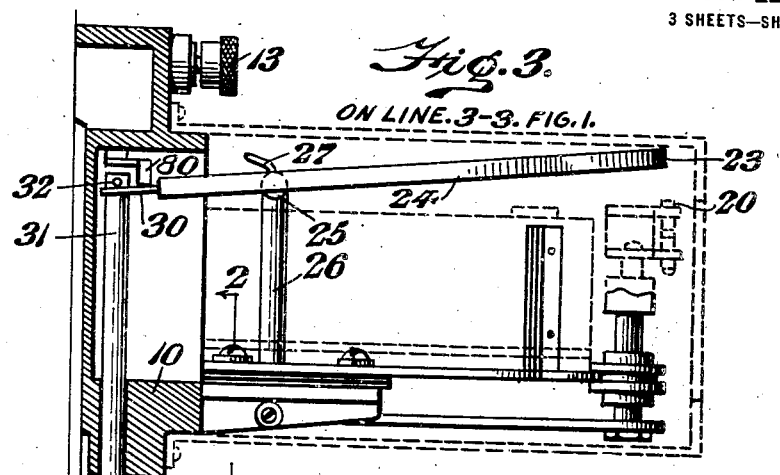
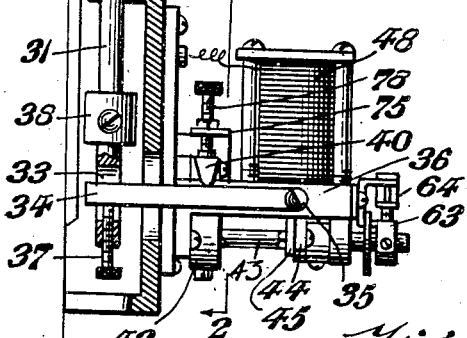
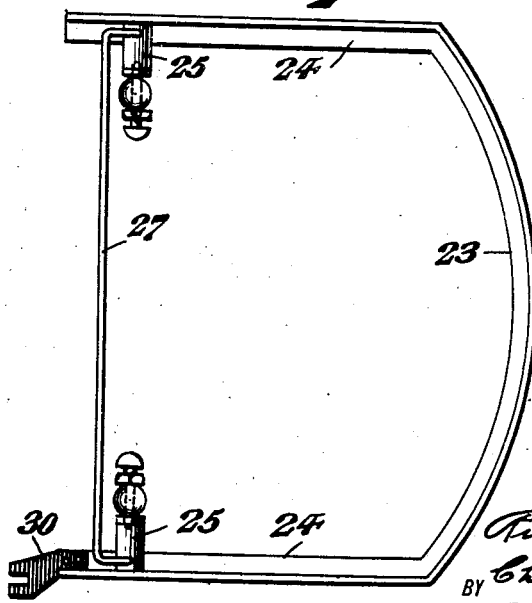

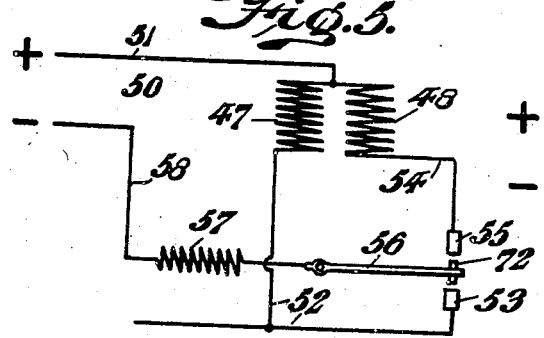
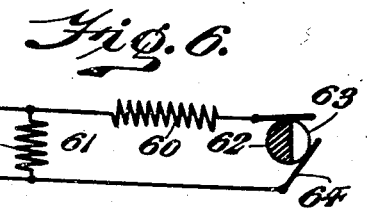
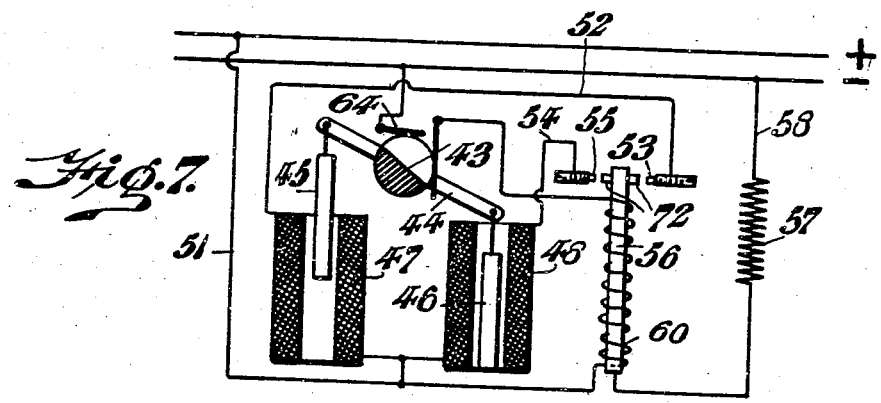
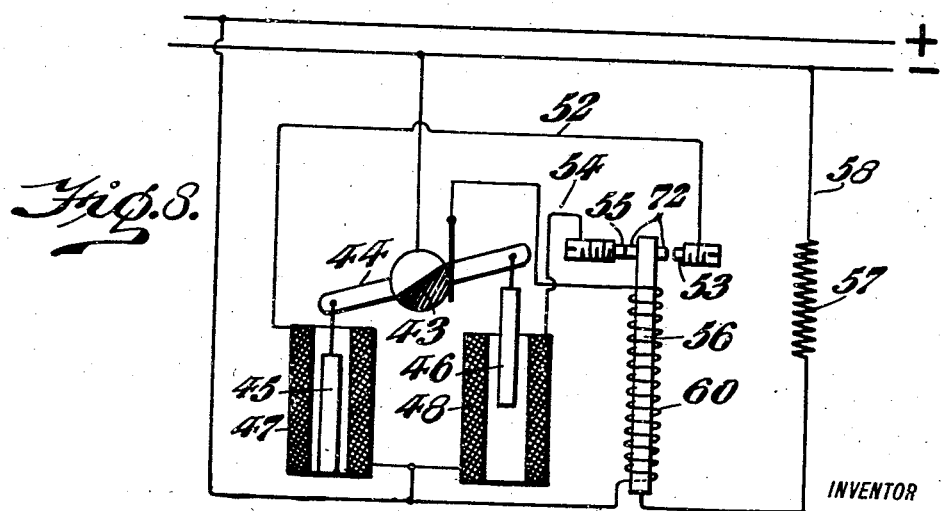

UNITED STATES PATENT OFFICE.

RICHARD P. BROWN AND CHARLES P. FREY, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

INDICATING AND RECORDING INSTRUMENT.

1,355,448.  Specification of Letters Patent.  Patented Oct. 12, 1920.

Application filed December 9, 1919. Serial No. 343,585.

*To all whom it may concern:*

Be it known that we, RICHARD P. BROWN and CHARLES P. FREY, citizens of the United States, and residents of Philadelphia, county of Philadelphia, State of Pennsylvania, have invented certain new and useful Improvements in Indicating and Recording Instruments, of which the following is a specification.

Some of the objects of the present invention are to provide means for intermittently actuating a movable element, such as a pointer or index, to indicate or record a temperature or pressure condition at a distant point at the moment of actuation; to provide means controlled by temperature for periodically actuating a movable element to cause an indication or record to be made of a condition at a distant point; to provide means for operating the depressor bar of an indicating or recording instrument; to provide means controlled by a thermostat for operating the depressor bar of an indicating or recording instrument at predetermined intervals; to provide means for automatically compensating a thermostat control to neutralize the effect of atmospheric temperatures upon said thermostat; to provide means for automatically locking the depressor bar of an indicating or recording instrument under inoperative conditions; to provide means for raising a depressor bar while an adjustment of an index or pointer is made; and to provide other improvements as will hereinafter appear.

Figure 1:
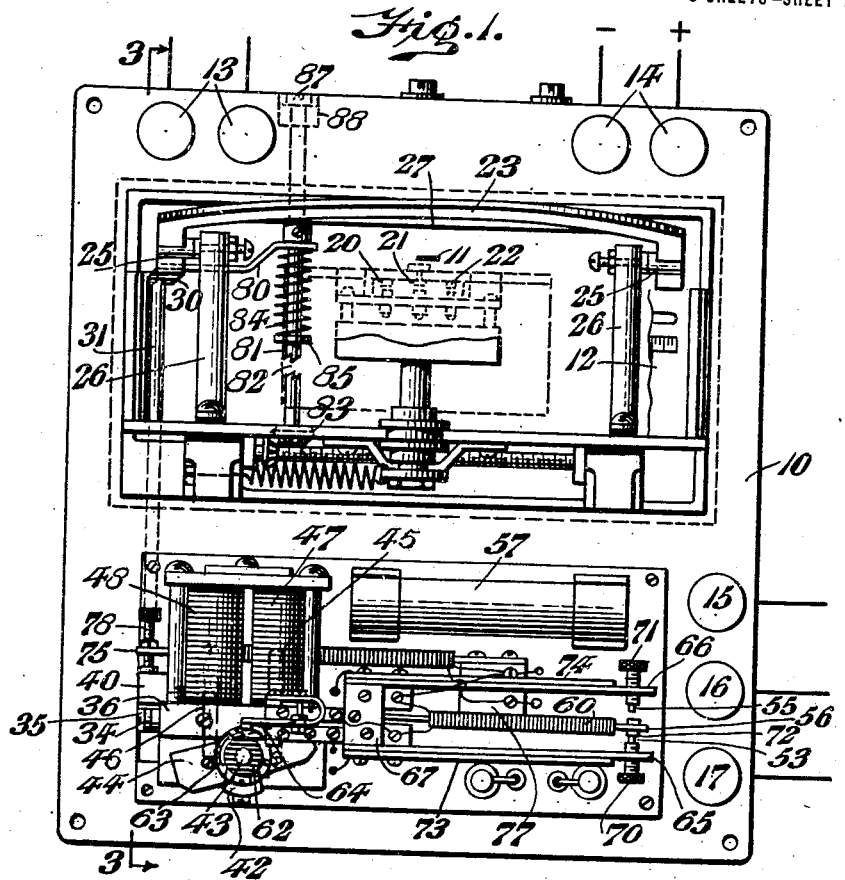
Figure 2:
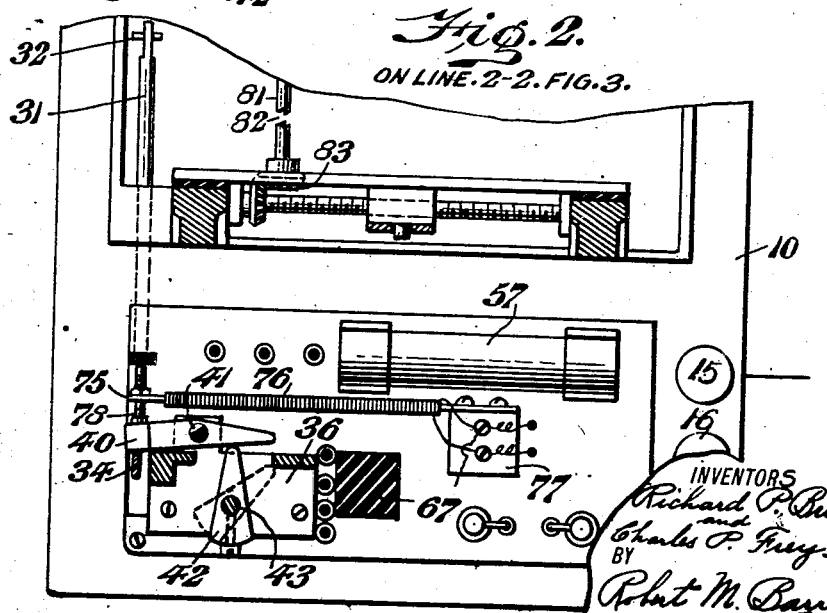

In the accompanying drawings Figure 1 represents a front elevation of an indicating instrument embodying one form of the present invention, the case of the instrument being removed; Fig. 2 represents a section on line 2—2 of Fig. 3; Fig. 3 represents a section on line 3—3 of Fig. 1; Fig. 4 represents a detail in plan of the depressor bar; Fig. 5 is a diagram of the main operating circuit; Fig. 6 is a diagram of the time and safety control circuits; Fig. 7 is a diagram of the operating circuit under heating conditions; and Fig. 8 is a diagram of the operating circuit under cooling conditions.

Referring to the drawings, one form of the present invention is shown arranged for use with an instrument for indicating temperature conditions and wherein positions of the instrument index are periodically transmitted to a distant point to be either recorded automatically or indicated by means arranged in a predetermined manner to enable an observer to tell at any operative period the temperature condition of the body under observation.

Since the indicating instrument and its adjuncts form no part of the present invention, only such elements thereof will be described as are here necessary to a full and complete understanding of the invention, and it will further be understood that the instrument shown is used only by way of example and that the present invention is applicable to many other forms of indicating and recording instruments.

The present indicating instrument is mounted upon a base 10 and consists primarily of a movable index or pointer 11 arranged to swing across the face of a scale 12 and assume indicating positions with respect thereto under the influence of a suitable operating mechanism such as a gas operated instrument or instrument controlled by variations in a current of electricity subject to thermo-couple connected to a pair of binding posts 13. The main service current for the instrument is received by a pair of binding posts 14 from which the necessary connections are made to the operating mechanism. In conjunction with this instrument a plurality of binding posts 15, 16 and 17 are utilized each being in a circuit including respectively circuit making flexibly mounted contacts 20, 21 and 22, these latter being located in relatively close proximity to the pointer 11 and in a position to be separately closed according as the pointer actuating mechanism carries the pointer 11 to strike one or another of them. Thus, if the pointer 11 is indicating the predetermined temperature it will, in the present instrument, lie in a position to close the contact 21 when operated by the periodic action; if the pointer 11 is indicating a temperature lower than the predetermined one it will lie in a position to close, say, the contact 20; and if the pointer 11 is indicating a temperature higher than the predetermined one it will lie in a position to close the contact 22. Whichever of the contacts 20, 21 or 22 is closed will cause the corresponding circuit from the binding posts 15, 16 and 17 to operate some type of indicating or recording device at a distant point and thus periodically keep an observer, at that point, advised as to temperature conditions where the thermo-couple is located.

In the present invention the pointer 11 is arranged to be depressed at regular intervals to strike a contact, by means of a depressor bar 23, of curved contour corresponding to the arc of travel of the pointer 11, located above the pointer 11 and having rearwardly extending lever arms 24 fulcrumed respectively in trunnion bearings 25 carried by posts 26 rigidly fixed to the base 10 but preferably insulated therefrom in any suitable manner. The bearings 25, in the present instance, are joined together by a rod 27 whereby a rigid construction is provided to cause the proper even tilting of the depressor bar 23. In the preferred construction the depressor bar 23 is so fulcrumed as to overbalance the short arm of the levers 24, and any parts attached to or carried thereby, and in consequence the contact impact is caused by the action of gravity.

For raising the depressor bar 23, one of the lever arms 24 is provided with a bifurcated extension 30, of bakelite or other insulating material, arranged to receive the shouldered end of a rod 31 and be fastened thereto by a pin 32 or other securing means to permit the proper movement of the parts. This rod 31 may be guided in a portion of the base 10 and is provided with a slot 33 for receiving the end of a trigger 34 which is pivoted at 35 to a suitable frame 36 fast to the base 10, the said slot 33 being preferably longer than the thickness of the trigger 34 for adjustment purposes through the action of a set screw 37 threaded into the end of the rod 31 and abutting the trigger 34. From the foregoing it will be evident that any movement of the trigger 34 about its pivot 35 in a counter-clockwise direction will cause the rod 31 to be moved in a direction to raise the depressor bar 23. A suitable counter-weight 38 is secured to the rod 31 to adjust the relative weights of the fulcrumed parts.

For shifting the trigger 34 a rock-lever 40 is pivoted at 41 to a convenient fixed part in a position to project at one end transversely above the trigger 34 while its opposite end extends into the path of movement of a cam 42 fixed to a rock-shaft 43, the arrangement being such that when the cam 42 is turned to engage the lever 40 the latter will be rocked and lower the trigger 34, thereby causing the depressor bar 23 to be raised.

In order to oscillate the rock-shaft 43, a yoke 44 is fixed to the said shaft 43 and extends to either side thereof, its ends being respectively connected to two solenoid cores 45 and 46 which pass respectively within two solenoids 47 and 48. These solenoids 47 and 48 are suitably mounted upon the frame 36 and are alternately energized so that first one core and then the other is drawn into its coil, thus transmitting a rocking movement to the shaft 43. The effect of this movement is to alternately engage and release the trigger 34 so that the depressor bar 23 rises and falls.

For the purpose of energizing the solenoids 47 and 48 alternately and periodically so that the shaft 43 is rocked at intervals, a circuit 50 is provided, supplied with current from the service line or other source, including a conductor 51, and two solenoids 47 and 48, the former of which is in a branch conductor 52 leading to a contact 53, and the latter in a branch conductor 54 leading to a contact 55. The circuit 50 is completed through one or the other of the contacts 53 and 55 by way of a movable contact arm 56 supported at one end, a ballast resistance 57 of any suitable type, and a conductor 58 forming the return to the service line. The selection, therefore, as to which solenoid 47 or 48 is energized depends upon the contact position of the arm 56.

For periodically causing the arm 56 to close first one and then the other branch of the circuit 50 by contact with the contacts 53 and 55 alternately, the arm 56 is formed of suitable thermostatic metal arranged to be heated by a winding 60 included in a circuit 61 which is intermittently opened and closed by a commutator 62, fixed to the rock-shaft 43 and carrying a conducting strip 63 as one terminal of the said circuit 61. A brush 64 forms the other terminal of the circuit 61 and is arranged to contact with the strip 63 in one operative position of the commutator 62 and to be out of contact in the other operative position of the commutator 62. It will thus be evident that the passage of a current through the winding 60 will cause the thermostatic arm 56 to expand, the free end thereof moving upward in the present illustrated showing, so closing the circuit 50 by way of contact 55 and causing the solenoid 48 to be energized.

In order to compensate for atmospheric temperature changes surrounding the timing thermostat 56 it is preferable to provide two strips 65 and 66 of thermostatic metal secured at one end respectively to a block 67 of insulating material fixed to the base 10, the construction being such that the said strips 65 and 66 parallel opposite sides of the thermostat arm 56 and locate the respective contacts 53 and 55, which are mounted in adjusting screws 70 and 71, in alinement with a double contact 72 fixed adjacent the end of the thermostat arm 56. The thermostatic strips 65 and 66 are respectively provided on their outer faces with relatively thin, flat elongated plates 73 and 74 for equalizing the expansion and contracting movement, and the arrangement is such that the three parallel thermostats 56, 65 and 66 all move in the same direction under atmospheric temperatures and maintain their respective distances apart. As a result of this construction relative changes are caused only by the heating effect of the current in winding 60 and the distance between the timing contact 72 and the contacts 53 and 55 will depend only upon this heating effect.

As a means for raising the depressor 23 automatically, should the service current fail or be intentionally cut off, and locking it in raised position until the current is again turned on, a safety device is provided consisting, in the present instance, of a thermostat including a strip 75 and a winding 76 thereon, the strip 75 being suitably fixed at one end to a block 77 and having its free end provided with a contact screw 78 positioned above the rock-lever 40. The screw 78 is adjusted to bear against the outer end of the lever 40 and hold it down when there is no current in the winding 76, thus causing the trigger 34 to raise and hold the depressor bar 23, but when the thermostat strip 75 is heated by a current the screw 78 is lifted a sufficient distance to allow the lever 40 to release the parts holding the depressor. The winding 76 is connected across the service lines at a suitable location, being preferably in parallel with the circuit 61 so that when the instrument is in operation current will pass through the winding 76 of the safety thermostat 75.

For the purpose of maintaining the depressor bar 23 raised while adjustment or setting of the instrument pointer 11 is made, a finger 80 is pivotally held at one end by an adjusting rod 81 and has its other end located above and adjacent to the extension 30 of the arm 24.

The rod 81 forms one element of a clutch 82, connected to the pointer adjusting gear 83, and a spring 84 is arranged to normally hold the clutch parts separated by being disposed between a fixed abutment 85 and a collar 86 fixed to the rod 81. A slotted head 87 is also fixed to the rod 81 and seats in a bore 88 of the base 10 at an accessible location and may be engaged by a screw driver or other suitable tool. Under normal conditions a turning movement of the rod 81 has no effect upon the adjusting elements but by pressing the rod 81 inward to engage the clutch members 82 the required adjustment of the pointer 11 may be made, while simultaneously the finger 80 forces the extension 30 downward and thus raises the depressor bar 23 out of the way while the adjustment is made.

In describing the operation of the present instrument control it will be assumed, first, that no current is supplied and the instrument is out of service. Under this condition the safety thermostat 75 is cold and is in a position holding the contact screw firmly seated upon the lever 40, which in this position is tilted to lock the trigger 34 down and thereby maintain the depressor bar 23 raised. Assuming, second, that the current is turned on, the immediate result is a flow of current through the winding 76 of the safety thermostat 75 and the latter thereupon swings in a direction to remove the contact 78 from the path of the rock-lever 40 whereby the depressor bar 23 is released. Since the commutator 62 is normally in position to close the circuit 61, the winding 60 receives current and the timing thermostat 56 gradually heats and moves toward the contact 53 so that after a predetermined interval the contact 72 meets the contact 53. When this takes place the circuit 50 is closed through the solenoid 47 and the core 45 drawn in, thereby bringing the cam 42 into engagement with the rock-lever 40 to cause the latter to actuate the trigger 34 and raise the depressor bar 23. The rocking of the shaft 43 turns the commutator 62 so that the circuit 61 is broken and consequently the current is cut off from the winding 60 and the thermostat 56 begins to cool, thereby breaking the circuit 50 and swinging ultimately to bring the contact 72 against the contact 55. When this occurs the circuit 50 is again closed but this time through the solenoid 48, thereby drawing the core 46 in and rocking the shaft 43 back to its former position where the commutator again closes the circuit 61 through the winding 60 of the timing thermostat.

In this manner solenoids 47 and 48 are alternately energized, each for a relatively short period of time, and the shaft 43 is periodically operated to release the depressor bar 23 for a striking movement and to raise the said bar 23 following this movement. The timing thermostat 56 controls the alternate energizing of the solenoids 47 and 48 and does its work reliably and accurately giving equal heating periods and equal cooling periods, both of which may be adjusted to any predetermined interval by varying the distance between the respective contacts 53 and 55 and the thermostat bar 56. These periods are preferably proportioned so that the depressor bar 23 remains down about seven to ten seconds and up fifteen to eighteen seconds, though the rate of rise and fall may be varied as desired through proper adjustment of the contacts as explained. While a relatively wide range of adjustment of the rate is possible it is advisable to give a rate sufficiently slow to permit the pointer 11 to come fully to rest, this being particularly desirable when there is much variation in the temperature of the furnace, kiln or other body under test.

In case there is a break in the service current the safety thermostat immediately comes into operation cooling and bringing the contact 78 into locking relation with the rock-lever 40 and thereby holding the depressor bar 23 up and preventing it from swinging loose or resting upon the pointer 11.

Although we have disclosed only one form in which this invention is embodied, it is to be understood that the invention is not limited to any particular construction but might be embodied in various forms without departing from the spirit of the invention or the scope of the appended claims.

Having thus described our invention, we claim and desire to protect by Letters Patent of the United States:

1. In an instrument of the character stated, the combination of an index member, a depressor bar arranged to strike said index member, and means including a thermostat for causing said bar to be moved in one direction.

2. In an instrument of the character stated, the combination of an index member, a depressor bar arranged to lower by gravity to depress said index member, and means including a thermostat for raising said bar after a depressing movement.

3. In an instrument of the character stated, the combination of an index member, a depressor bar arranged to lower by gravity to depress said index member, and means including a thermostat for raising said bar a predetermined interval after a depressing movement.

4. In an instrument of the character stated, the combination of an index member, a depressor bar arranged to lower by gravity to depress said index member, means including a thermostat for raising said bar a predetermined interval after a depressing movement, and means to vary said interval.

5. In an instrument of the character stated, the combination of an index member, a depressor bar arranged to lower by gravity to depress said index member, and means including a thermostat for locking said bar in raised position when the current is cut off from said instrument.

6. In an instrument of the character stated, the combination of an index member, a depressor bar arranged to lower by gravity to depress said index member, means controlled by an electric current for raising said depressor bar, and means operated by the cessation of said current for locking said bar in raised position.

7. In an instrument of the character stated, the combination of an index member, a depressor bar arranged to shift said index member, means for operating said depressor bar, and means including a thermostat for holding said bar out of contact with said index member when current is cut off from said instrument.

8. In an instrument of the character stated, the combination of an index member, a depressor bar arranged to shift said index member, means for operating said depressor bar, and means automatically operative to hold said bar out of contact with said index member when said operating means ceases to function.

9. In an instrument of the character stated, the combination of an index member, a depressor bar arranged to shift said index member, a solenoid controlled means for operating said depressor bar, means including a thermostat for causing said solenoid means to become energized, a source of current, and means for periodically causing said thermostat to be heated by said current to energize said solenoid means.

10. In an instrument of the character stated, the combination of an index member, a depressor bar arranged to shift said index member, a solenoid controlled means for operating said depressor bar, means including a timing thermostat for causing said solenoid means to become energized, a source of current, means for periodically causing said timing thermostat to be heated by said current to energize said solenoid means, and a pair of thermostats operating with said timing thermostat means to compensate for atmospheric temperature conditions.

11. In an instrument of the character stated, the combination of an index member, a depressor bar arranged to shift said index member, a solenoid controlled means for operating said depressor bar, an electric circuit including a timing thermostat and a pair of compensating thermostats for energizing said solenoid means, contacts carried respectively by said compensating thermostats and arranged to be separately engaged by said timing thermostat, and means for periodically causing said timing thermostat to be heated, whereby said contacts are alternately engaged by said timing thermostat and said depressor bar is reciprocated.

12. In an instrument of the character stated, the combination of an index member, a depressor bar arranged to shift said index member, means for operating said depressor bar, and means automatically operative to lock said bar when said operating means ceases to function.

In witness whereof we have hereunto set our hands this 27 day of November, 1919.

RICHARD P. BROWN.
CHARLES P. FREY.